United States Patent
Buckley et al.

(10) Patent No.: US 7,130,342 B2
(45) Date of Patent: Oct. 31, 2006

(54) WIRELESS RECEIVER AND METHOD EMPLOYING FORWARD/BACKWARD RECURSIVE COVARIANCE BASED FILTER COEFFICIENT GENERATION

(75) Inventors: Michael Eoin Buckley, Gurnee, IL (US); Raja Bachu, Waukegan, IL (US); Kenneth Stewart, Grayslake, IL (US)

(73) Assignee: Motorola, Inc., Schaumburg, IL (US)

( * ) Notice: Subject to any disclaimer, the term of this patent is extended or adjusted under 35 U.S.C. 154(b) by 672 days.

(21) Appl. No.: 10/330,629

(22) Filed: Dec. 27, 2002

(65) Prior Publication Data

US 2004/0125895 A1  Jul. 1, 2004

(51) Int. Cl.
*H04H 7/30* (2006.01)
(52) U.S. Cl. .................. 375/229; 375/232; 375/285; 375/350; 455/307
(58) Field of Classification Search ............... 375/229, 375/230, 232, 233, 235, 285, 340, 346, 347, 375/267, 350; 455/296, 307, 63, 65, 67.1, 455/67.3; 370/320, 321, 341–345, 441, 442, 370/465, 479, 480, 252; 708/322, 323
See application file for complete search history.

(56) References Cited

U.S. PATENT DOCUMENTS 6,658,071 B1 * 12/2003 Cheng ....................... 375/348
6,952,460 B1 * 10/2005 Van Wechel et al. ....... 375/350
6,954,495 B1 * 10/2005 Piirainen .................... 375/233

OTHER PUBLICATIONS

Yakun Sun, Reduced-rank Adaptive Equalization, Northwestern University, Evanston, Illinois, Jan. 30, 2001.
David C. Ricks and J. Scott Goldstein, Efficient Architectures for Implementing Adaptive Algorithms, Proceedings of the 2000 Antenna Applications Symposium, Allerton Park, Monticello, Illinois, Sep. 20-22, 2000.

* cited by examiner

*Primary Examiner*—Dac V. Ha
(74) *Attorney, Agent, or Firm*—Vedder, Price, Kaufman & Kammholz, P.C.

(57) ABSTRACT

A wireless receiver and method employs a forward/backward recursive covariance based filter coefficient generation scheme for equalizing a received wireless signal, such as a CDMA signal or other suitable signal. A forward/backward recursive covariance based filter coefficient generating circuit (206) includes a forward recursion portion (300) that receives data representing channel estimates (18) of a communication channel, and data representing an auto-covariance matrix (22). The forward recursion portion (300) produces a set of output values (306) from each iteration stage (400a–400n) of the forward recursion portion (300). The set of output values (306) are stored and a backward recursion portion (302) obtains the set of output values (306) and also receives the data representing the auto-covariance matrix (22), and generates filter coefficients (208) based on this information.

13 Claims, 5 Drawing Sheets

WIRELESS RECEIVER AND METHOD EMPLOYING FORWARD/BACKWARD RECURSIVE COVARIANCE BASED FILTER COEFFICIENT GENERATION

FIELD OF THE INVENTION

The invention relates generally to wireless receivers and methods that equalize received signals, and more particularly to channel equalizers and methods.

BACKGROUND OF THE INVENTION

Wireless communication systems, including but not limited to, cellular systems, such as code division multiple access systems (CDMA) are known to use wireless receivers that employ variations of Weiner filter structures to compensate for channel related variations. Such channel variations can result in signal fading or multi-path signals that arrive at a receiver's antenna at different times depending upon their route from a transmitting antenna. As such, copies of the same signal may be received and are combined in a manner to improve received signal strengths. Channel equalizers, as known in the art, include filters that attempt to use energies of various copies to get a stronger signal. For example, approximations of Weiner filters are used in an attempt to correct for signal reductions and variations caused by channel conditions. As such Weiner filters are used to approximate an inverse of a channel's characteristics. As known in the art it is desirable to reduce errors of equalizers.

Also, for CDMA systems, it is known for example to use pilot sequences that are used to send known information so that a wireless receiver can determine channel characteristics. As such, wireless receivers are known to include a receiving antenna that is coupled to a radio frequency section which performs demodulation and other functions. The receiver may also include a square root raised cosine filter, a channel equalizer, a log likelihood ratio extraction circuit and a turbo decoder to decode received voice information. The channel equalizer circuitry may employ for example lattice multistage Weiner equalizers. The Weiner equalizers work in the time domain for example.

Chip level equalizers have been proposed for high speed downlink packet access as a mechanism of suppressing inter-code interference. By virtually restoring the orthogonality of the downlink channels, these chip level equalizers help avoid a main performance limitation of a RAKE receiver, and can dramatically improve system performance. A low complexity approximation to a Weiner filter would be useful.

FIG. 1 illustrates one example of a known channel equalizer 10 is operatively coupled to a receiving antenna 12 through one or more signal processing stages. As shown, a fast Fourier transform stage 14 changes the received wireless signal you into the frequency domain. The resultant received signal y(f) is then passed to a channel estimator circuit 16 which produces for example channel estimates for a group of chips represented as channel estimates $P_D$ 18. The received signal is also passed to an auto-covariance estimator 20 which produces data representing an auto-covariance matrix 22. The received signal is also buffered by buffer stage 24 until filter coefficients are determined. Buffer 24 may be a plurality of fast Fourier transforms as known in the art. The channel estimates 18 and the data representing the auto-covariance matrix 22 are received by a filter coefficient estimator 26 which may be, for example, a forward recursive covariance based coefficient generator, such as that described for example in an article entitled "Reduced Rank Adaptive Equalization", authored by Yakun Sun, dated Jan. 30, 2001 which describes reduced rank adaptive space time equalization. Such coefficient generators generate filter coefficients 28 for an equalizer circuit 30 to suitably program the equalizer 30 (i.e. filter) to compensate for channel characteristics. Such coefficient generators are also sometimes referred to minimum mean squared error equalizer coefficient generators.

However, forward recursive covariance based coefficient generators typically require the calculation of normalized cross covariance vectors which when implemented in digital processors or other hardware, may be difficult to program. As such receivers may be more costly than necessary. In addition, such equalizer operations tend to operate in a forward recursion fashion only and can result in increasing vector sizes resulting from the numerous forward recursions.

BRIEF DESCRIPTION OF THE DRAWINGS

The present invention is illustrated by way of example and not limitation in the accompanying figures, in which like references numerals indicate similar elements, and in which.

DETAILED DESCRIPTION OF THE PREFERRED EMBODIMENT

Briefly, a wireless receiver and method employs a forward/backward recursive covariance based filter coefficient generation scheme for equalizing a received wireless signal, such as a CDMA signal or other suitable signal. The wireless receiver employs a forward/backward recursive covariance based filter coefficient generating circuit, such as a suitably programmed digital signal processor or other suitable hardware, software, firmware or any other suitable combination thereof. The coefficient generating circuit includes a forward recursion portion that receives data representing channel estimates of a communication channel, and data representing an auto-covariance matrix, whose elements are the correlation of the received signal with delayed versions of itself. The forward recursion portion produces a set of output values from each iteration stage of the forward recursion portion. Memory, is operatively coupled to the forward recursion portion and stores the set of output values generated by the forward recursion portion. A backward recursion portion of the forward/backward recursive covariance based filter coefficient generating circuit, obtains the set of output values from the memory and also receives the data representing the auto-covariance matrix, and generates filter coefficients based on this information. The filter coefficients are provided to a filter circuit that equalizes the received signal information based on the generated filter coefficients. A number of fast Fourier transform operations are performed to suitably convert information from a frequency to a time domain and from a time domain to a frequency domain as required. The forward/backward recursive covariance based filter coefficient generating circuit utilizes fixed length basis vector data and backward recursion, and avoids the need to determine variable length vectors required in other known chip level equalizers. For example the normalized cross covariance vectors of other approaches need not be determined. Other advantages will be recognized by those of ordinary skill in the art.

A method is disclosed for equalizing a received wireless signal that includes receiving data representing channel estimates, receiving data representing an auto-covariance matrix, such as from an auto-covariance generator, or other suitable source and at each stage of recursion, performing forward recursion using the channel estimate data and the auto-covariance matrix data, to produce the set of output values, such as z-scaler, p-scaler and basis vector data, for each iteration stage of a forward recursion operation. The method also includes storing the set of output values in memory and performing backward recursion by receiving the data representing the auto-covariance matrix and using the set of output values from memory from the forward recursion, to generate filter coefficients for a filter.

Figure 1:
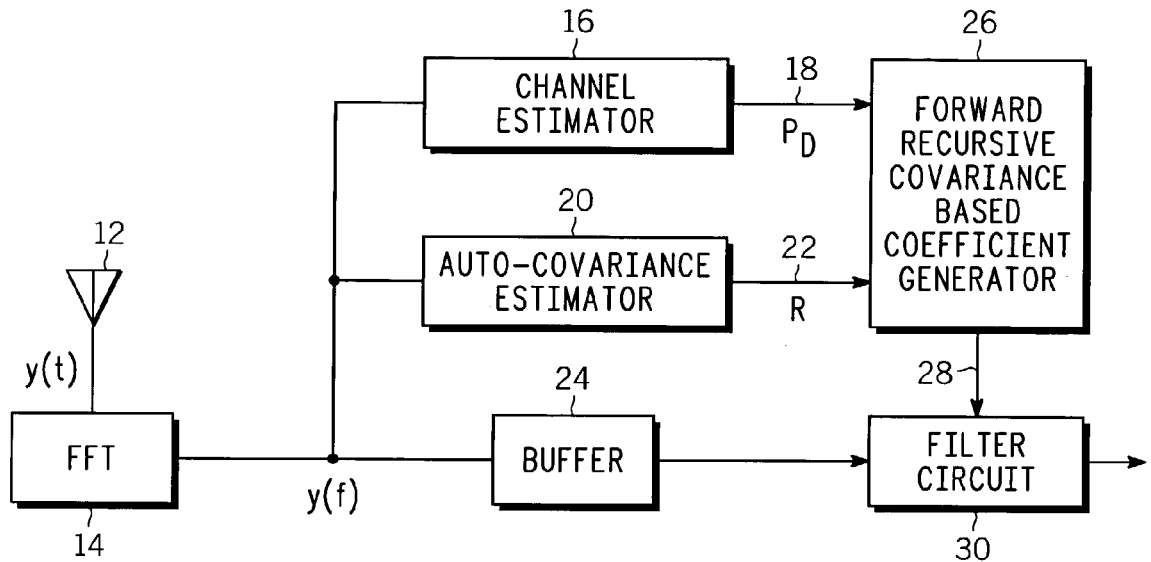
FIG. 1 is a block diagram illustrating a prior art wireless receiver that employs a forward recursive covariance based coefficient generator.
Figure 2:
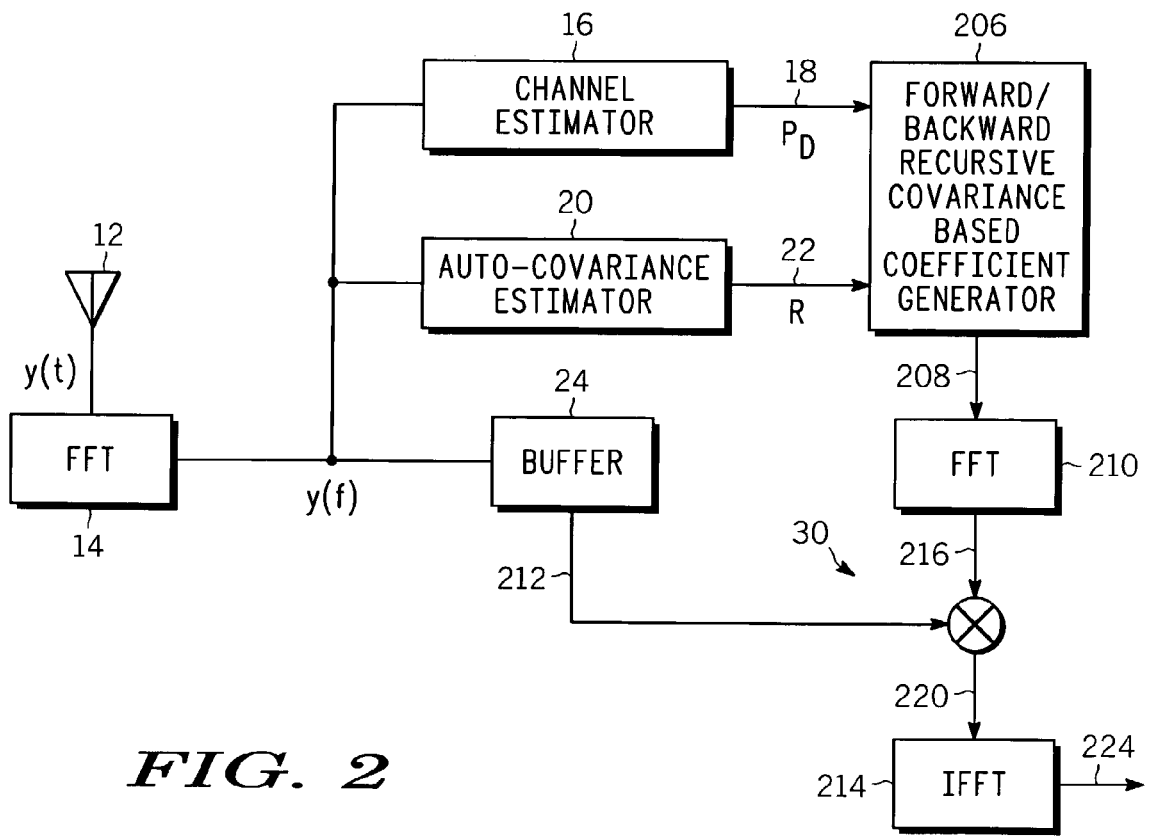
FIG. 2 is a block diagram illustrating one example of a portion of a wireless receiver that includes a forward/backward recursive covariance based filter coefficient generating circuit in accordance with one embodiment the invention.

FIG. 2 illustrates one example of a wireless receiver 200 in accordance with one embodiment of the invention. As shown, the wireless receiver 200 may include the antenna 120 and other conventional components as mentioned with respect to FIG. 1. The antenna receives signal y(n) 202 which becomes a received wireless signal 204 and is converted to the frequency domain by filter 14. However, in contrast to known wireless receivers, the wireless receiver 200 also includes a forward/backward recursive covariance based filter coefficient generating circuit 206 which outputs generated filter coefficients 208 for filter circuit 30 based on a forward and backward recursion operation as described below. Newly generated filter coefficients 208 may be generated every 20 milliseconds, continuously, or at any other suitable interval. For purposes of illustration only, and not limitation, the channel estimates 18 are provided for a group of 1,584 chips. Also, by way of example, and not limitation, all fast Fourier transform operations (FFTs) and inverse FFTs, are for example 128 point filters and assume a 30 tap equalizer or filter circuit 30. However any suitably sized filters and any suitable number of taps may be used.

The forward/backward recursive covariance based filter coefficient generating circuit 206 may be a suitably programmed digital signal processor and associated memory, discreet logic, firmware, state machine software executing on a suitable processing device, or any suitable combination thereof. As described herein, the forward/backward recursive covariance based coefficient generator will be described as being implemented by a DSP which may be suitably programmed in a programmable language such as C, C++ or other suitable language. However it will be understood that the invention is not limited thereto.

The filter circuit 30 in this example, may also be implemented in the DSP that implements the filter coefficient generating circuit 206. The filter circuit 30 also includes, a fast Fourier transform circuit 210, a multiplier circuit 212 and an inverse FFT circuit 214. The multiplier circuit 212 receives the buffered signal output from the buffer 224 and also receives transformed coefficient data 216 from the FFT circuit 210 and combines the signal as known in the art to generate output data 220 for the inverse FFT circuit 214 to produce equalized received signal information 224.

The FFT circuit 210 converts the filter coefficients 208 from a time domain to a frequency domain and the output 216 serves as filter coefficients for the multiplier 12. As is known in the prior art, the FFT circuit 210 performs an N-point FFT operation, or in other words takes a time domain N element block and outputs the equivalent frequency domain N element block. As is known in the prior art, the filter coefficients 208 may number less than N, but through a technique known as zero padding, the N-point FFT of 210 may still be applied to produce the N-point frequency domain representation of these filter coefficients 216. The multiplier then performs an element wise multiplication on the block of N-elements 216 by the block of N-elements 212.

Figure 3:
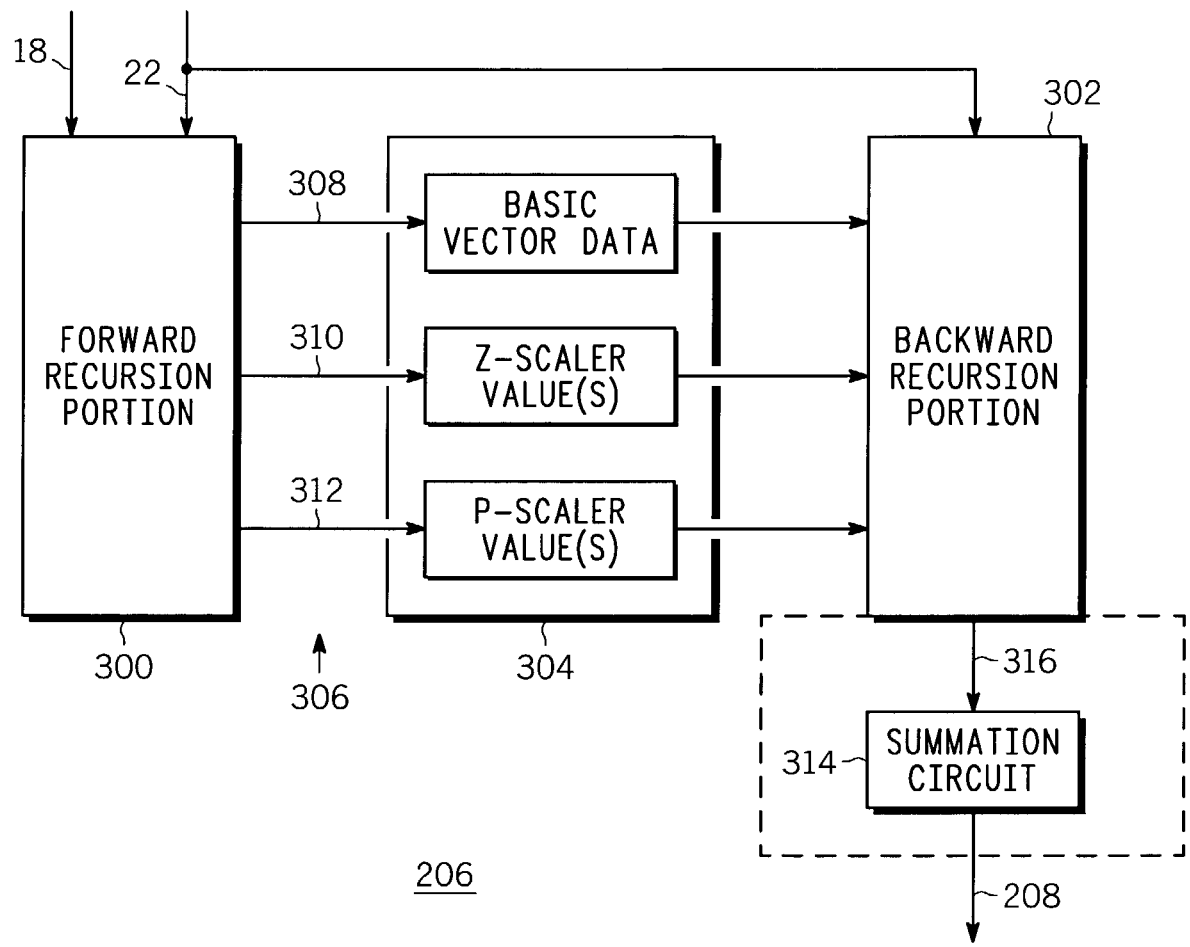
FIG. 3 is a block diagram illustrating one example of a forward/backward recursive covariance based filter coefficient generating circuit in accordance with one embodiment the invention.

FIG. 3 illustrates in more detail, the forward/backward recursive covariance based filter coefficient generating circuit 206 of FIG. 2. The forward/backward recursive covariance based filter coefficient generating circuit 206 includes a forward recursion portion 300, a backward recursion portion 302 and memory 304. The forward recursion portion 300 receives data representing channel estimates 18 for a group of chips used in the wireless communication and also receives data representing the auto-covariance matrix 22 from the channel estimator 16 and the auto-covariance estimator 20 respectively. The data representing the channel estimates 18 and the data representing the auto-covariance matrix 22 may be stored in any suitable memory. The forward recursion portion 300 produces a set of output values 306 for each iteration stage of a forward recursion stage carried out by the forward recursion portion 300. The set of output values 306 includes a basis vector data 308 representing a basis vector, a z-scaler 310 and a p-scaler 312. The memory 304 is operatively coupled to the forward recursion portion 300 to receive the set of output values 306 and store the set of output values 306 therein. The memory 304 may include any suitable memory including but not limited to RAM, ROM, optical memory, or any other suitable memory.

The backward recursion portion 302 is operatively coupled to the memory 304 to retrieve the stored set of output values 306 from memory 304. In addition, the backward recursion portion 302 also receives the data representing the auto-covariance matrix 22 and uses the set of output values 306 from the memory 304 as well as the auto-covariance matrix data 22 and generates filter coefficients 208 based on the information. The backward recursion portions 302 is shown to include a summation circuit 314 which outputs the filter coefficients 208. The summation circuit 314 may be part of the backward recursion portion or of another circuit if desired. The summation portion 314 receives backward covariance based values 316 from each recursion stage of the backward recursion portion. The summation circuit 314 also receives basis vector data 308 as generated by the forward recursion portion 300.

Figure 4:
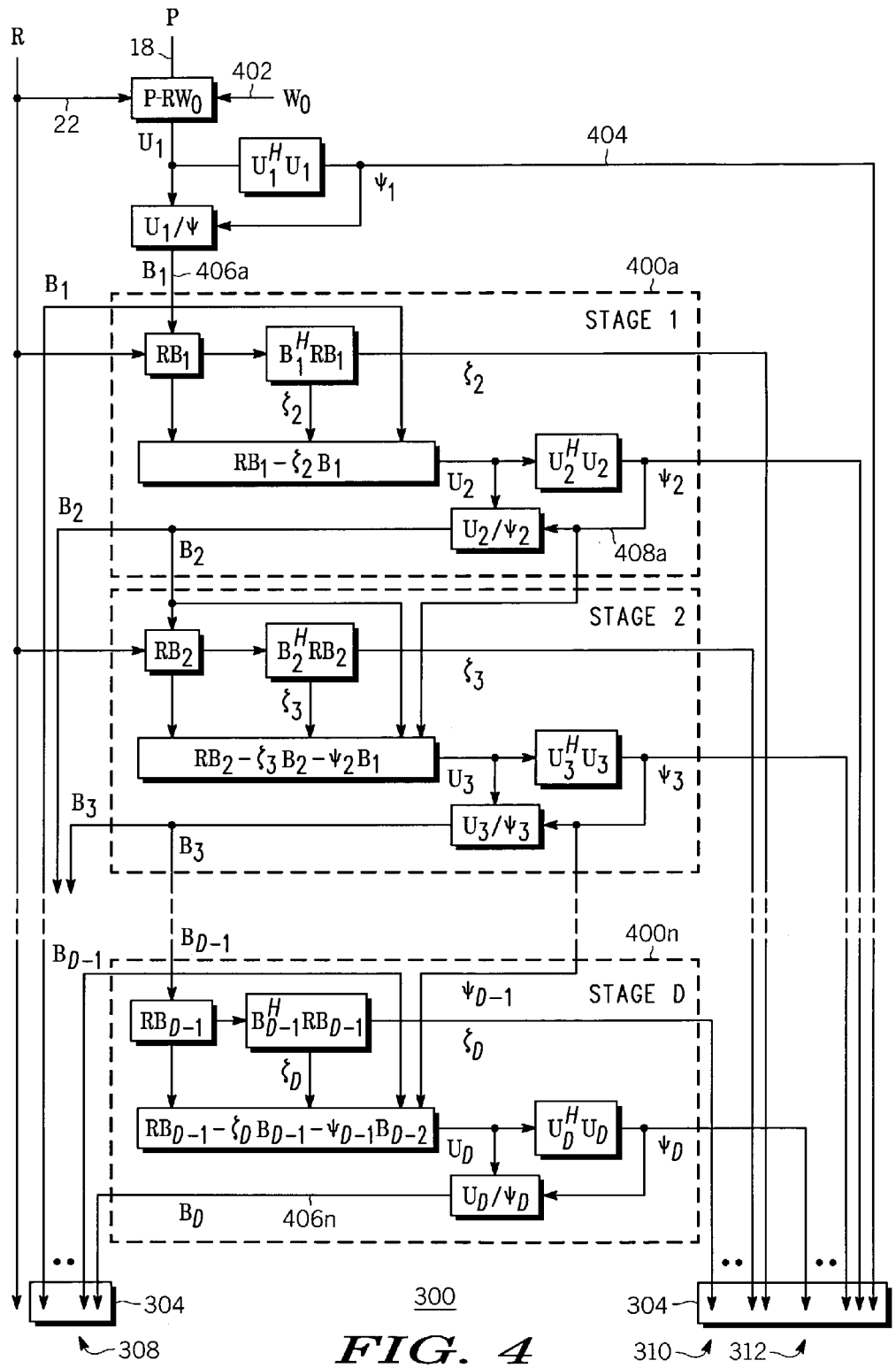
FIG. 4 is a block diagram diagrammatically illustrating one example of a forward recursion portion of a forward/backward recursive covariance based filter coefficient generating circuit in accordance with one embodiment of the invention.
Figure 5:
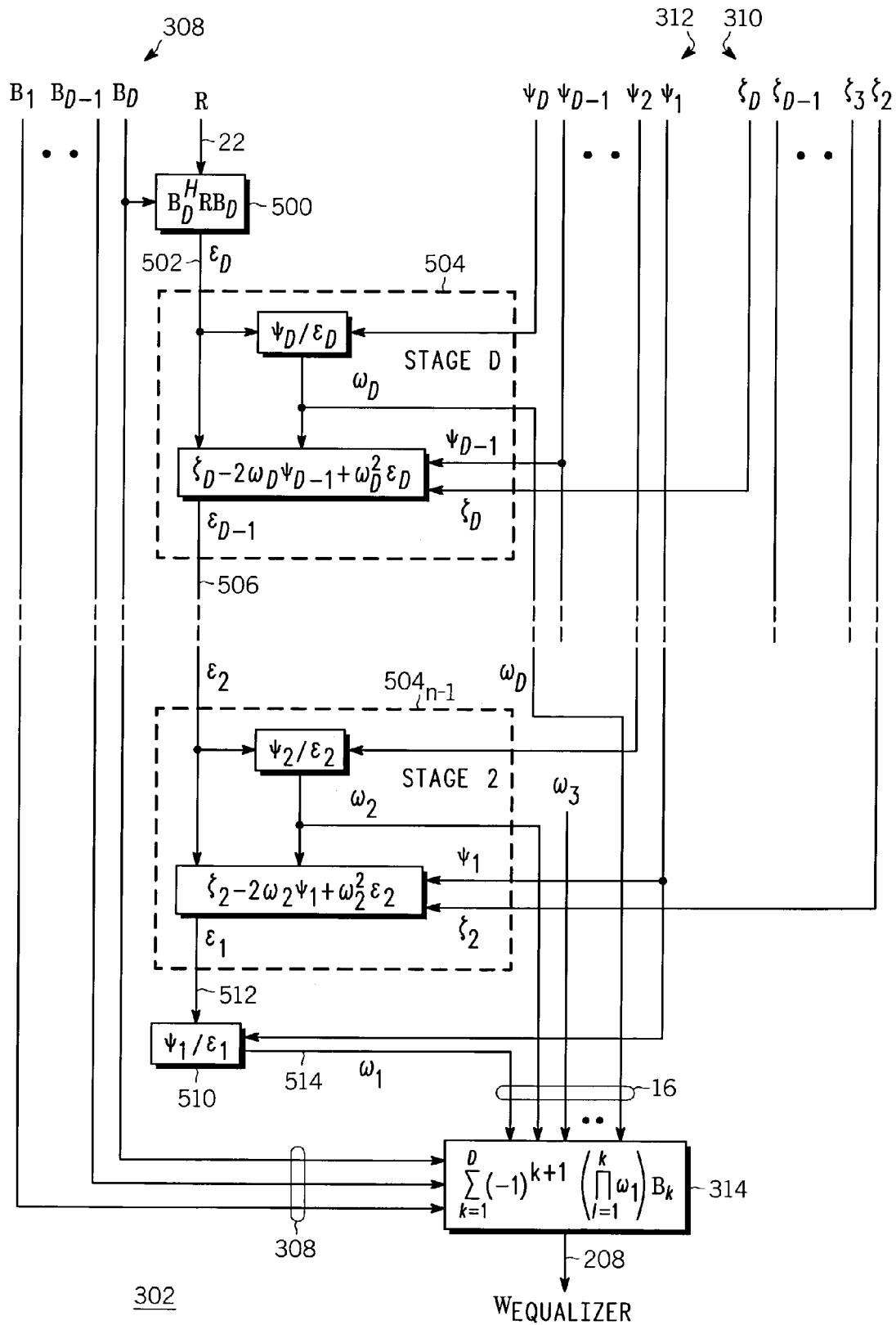
FIG. 5 is a block diagram diagrammatically illustrating one example of a backward recursion portion of a forward/backward recursive covariance based filter coefficient generating circuit in accordance with one embodiment of the invention.

Referring to FIGS. 4 and 5, a more detailed diagram of the forward recursion portion, memory, and backward recursion portion 300–304 will be described. The forward recursion portion 300 includes a plurality of iteration stages or recursion stages indicated as 400a–400n. As a preliminary matter, each of the blocks shown represent one or more mathematical operations performed on vector data by the DSP.

The following operations describe a forward followed by a backward recursion process as further described below. The forward recursions provide a set of basis vectors $B_k$ k∈{1, . . . , D}, providing a subspace with which to obtain an approximation $W_{equalizer}$ of the Wiener filter $w_{Wiener}$, where R is the auto correlation matrix, P is the channel estimate and $W_0$ is an initial estimate of $W_{Wiener}$ that may be available from sources other than R and P such as during the previous calculation of $w_{equalizer}$. If no initial estimate of $w_{Wiener}$ is available then $W_0$ may be set to the all zero vector. The optimal combining of the basis vectors $B_k$ is determined by the weighting scalars $w_k$ which are in turn determined during the backward recursion by the z- and p-scalars $\zeta_k$ and $\psi_k$.

k=1

$U_1 = P - RW_0$ $\psi_1 = \|U_1\|$ $B_0 = 0$ $B_1 = U_1/\psi_1$ while k≤D k=k+1

$\zeta_k = B_{k-1}^H RB_{k-1}$ $U_k = RB_{k-1} - \zeta_k B_{k-1} - \psi_{k-1} B_{k-2}$ $\psi_k = \|U_k\|$ $B_k = U_k/\psi_k$ end $\epsilon = B_D^H RB_D$ $w_D = \psi_D/\epsilon$ while k>1 k=k-1

$\epsilon = \zeta_k - 2w_{k+1}\psi_k + w_{k+1}^2 \epsilon$ $w_k = \psi_k/\epsilon$ end $$w_{equalizer} = \sum_{k=1}^{D} (-1)^{k+1} \left( \prod_{l=1}^{k} w_l \right) B_k$$

It will be assumed that if desired, a previous coefficient from a previous filter may be reused to reduce the number of iterations necessary for the recursion process. Accordingly, filter coefficient vector 402 may be used for a recursion process to reduce the number of iterations if desired. The auto-covariance matrix data 22 is used in part along with a first stage p-scaler 404 to generate a first stage basis vector 406. The first stage is represented as $B_1$. The first stage basis vector data $B_1$ is then stored in memory 304 for use by the summation circuit 314. Iteration stage 400a and each stage of forward recursion, receives the data representing the auto-covariance matrix 22 along with a basis vector data from a previous forward recursion stage represented as 406a–406n ($B_D$). Data representing each of the basis vectors is stored in memory 304. Each forward recursion stage also generates a p-scaler value indicated as 408a–408n which make up the p-scaler values 312.

The backward recursion portion 302 utilizes the basis vector data of the last stage of the forward recursion process 406n as an input to a multiplier circuit 500 which performs a vector and matrix multiplication operation. The result is an e-scaler value 502 which is used as input to a corresponding backward recursion stage 504. The backward recursion portion 302 uses one less recursion stage than the forward recursion portion 300 and as such includes backward recursion stages 504 through 504n–1. Each backward recursion stage 504, or backward iteration stage generates an e-scaler value 506 which is used by a next backward recursion stage.

The multiplication circuit 500 also receives the data representing the auto-covariance matrix 22. Each of the backward recursion stages 504–504n–1 also receives a corresponding p-scaler value 312 and corresponding z-scaler value 310 as shown. A divider circuit 510 receives a p-scaler value associated with the first stage of the forward recursion process as well as an e-scale value 512 from a final backward recursion stage 504n–1 and produces backward covariance based value 514 also referred to as backward covariance based values 16. Each of the backward recursion stages 504–504n–1 generates a corresponding backward covariance based value which serves as an input to the summation circuit 314. As such, each recursion stage of the backward recursion portion generates a backward covariance based value 572. The summation circuit 314 is operatively coupled to receive the backward covariance based value from each recursion stage of the backward recursion portion and also receives the basis vector data from the forward recursion portion and produces the filter coefficients 208.

Figure 6:
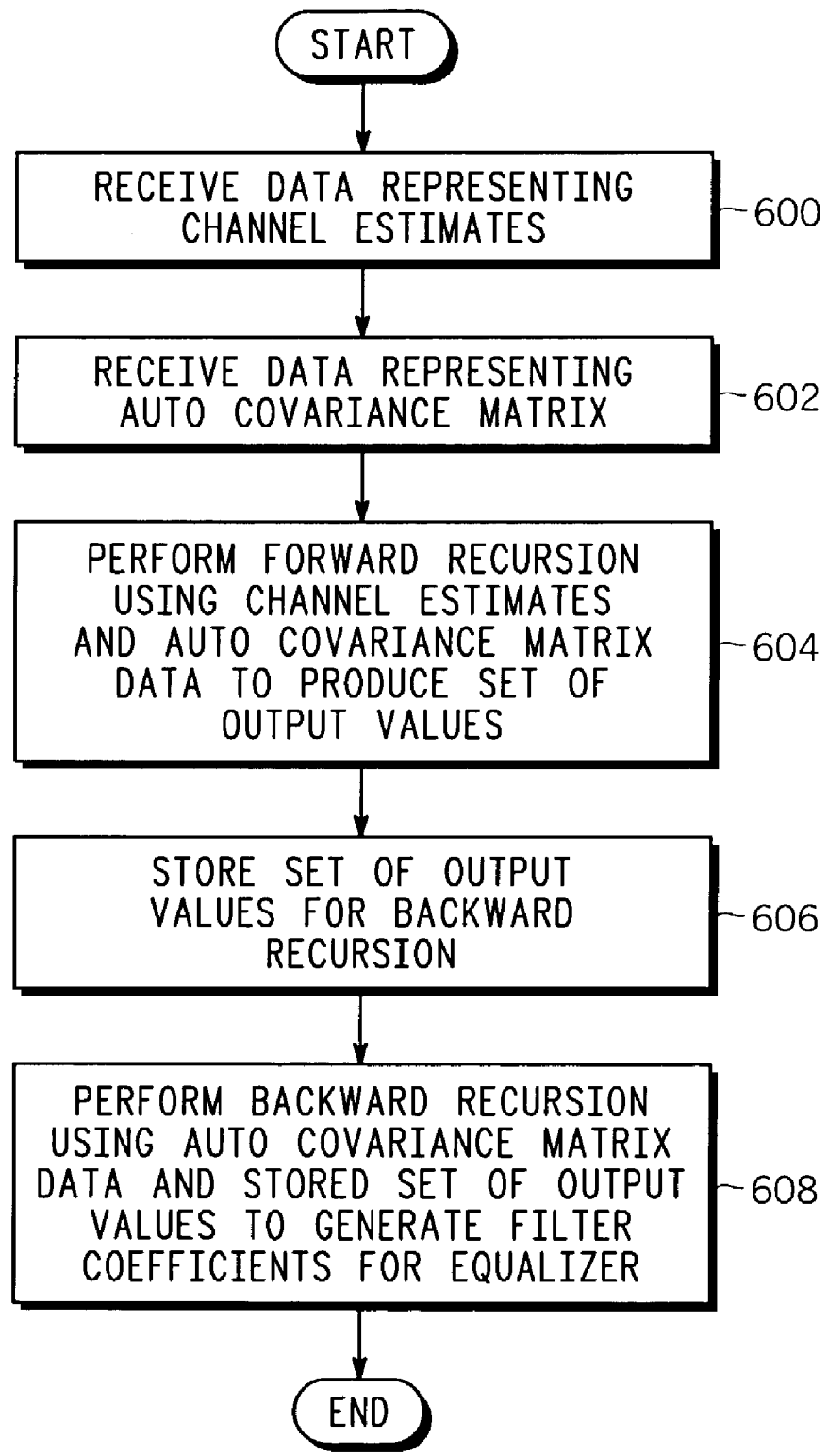
FIG. 6 is a flowchart illustrating one example of a method for equalizing a received wireless signal in accordance with one embodiment of the invention.

FIG. 6 represents a method for equalizing a received wireless signal in accordance with one embodiment of the invention. The method may be carried out by the wireless receiver 200. However, any other suitable structure may also be used. It will be recognized that the method will be described as a series of operations, but the operations may be performed in any suitable order. As shown in black 600, the method includes receiving data representing channel estimates, such as channel estimate data 18, from for example a channel estimator circuit or other suitable source. The method also includes, as shown on block 602, receiving data representing auto-covariance matrix data such as auto-covariance matrix data 22 received from an audio-covariance generator. Each stage of forward recursion uses the auto-covariance matrix data. As shown in block 604, the method include performing forward recursion using the channel estimate data 18 and the auto-covariance matrix data 22, as shown for example in FIGS. 4 and 5, to produce a set of output values, such as output values 206 for each iteration stage of the forward recursion operation. As shown in block 606, the method includes storing the set of generated output values in memory and as shown in block 608, performing backward recursion by receiving the auto-covariance matrix data and using the set of output values from forward recursion to generate filter coefficients for a filter.

The method may also include generating the backward covariance base value 16 for each backward recursion stage based on the stored output values from a corresponding forward recursion operation. The method may also include storing the backward covariance based value from each recursion stage of the backward recursion operation and generating the filter coefficients based on the stored backward covariance based values and data from the channel estimates, such as the basis vectors.

As such, among other advantages, the above described apparatus and methods do not utilize variable length cross covariance vectors and employs forward and backward recursion process which can provide advantages over other techniques.

It should be understood that the implementation of other variations and modifications of the invention and its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A wireless receiver comprising:
   a forward/backward recursive covariance based filter coefficient generating circuit for equalizing a received signal including:
   a forward recursion portion that receives data representing channel estimates and data representing an auto-covariance matrix, that produces a set of output values for each iteration stage of the forward recursion portion;
   memory, operatively coupled to the forward recursion portion that contains the set of output values; and
   a backward recursion portion, operatively coupled to the memory and to receive the data representing the auto covariance matrix, and that uses the set of output values from the memory and generates filter coefficients based thereon; and
   a filter circuit, operatively responsive to the generated filter coefficients and operative to equalize received signal information.

2. The wireless receiver of claim 1 wherein the stored set of output values includes at least one of: basis vector data, p-scaler values and z-scaler values.

3. The wireless receiver of claim 1 wherein the forward recursion portion receives data representing channel estimates for a group of chips used in a wireless communication and the data representing the auto-covariance matrix.

4. The wireless receiver of claim 2 wherein each recursion stage of the backward recursion portion generates a backward covariance based value and wherein the forward/backward recursive covariance based filter coefficient generating circuit includes a summation circuit operatively coupled to receive the backward covariance based value from each recursion stage of the backward recursion portion and to receive the basis vector data from the forward recursion portion and to output the filter coefficients.

5. A wireless receiver comprising:
   a channel estimator circuit that receives a signal and produces data representing channel estimates therefrom;
   an auto-covariance estimation circuit that receives the signal and produces data representing an auto-covariance matrix therefrom; and
   a forward/backward recursive covariance based filter coefficient generating circuit, operatively coupled to the channel estimator circuit and to the auto-covariance estimation circuit, including:
   a forward recursion portion that receives data representing channel estimates and data representing an auto-covariance matrix, that produces a set of output values for each iteration stage of the forward recursion portion;
   memory, operatively coupled to the forward recursion portion that contains the set of output values; and
   a backward recursion portion, operatively coupled to the memory and to receive the data representing the auto covariance matrix, and that uses the set of output values from the memory and generates filter coefficients based thereon; and
   a filter circuit, operatively responsive to the generated filter coefficients and operative to equalize received signal information.

6. The wireless receiver of claim 5 wherein the stored set of output values includes at least one of: basis vector data, p-scaler values and z-scaler values.

7. The wireless receiver of claim 5 wherein the forward recursion portion receives data representing channel estimates for a group of chips used in a wireless communication and the data representing the auto-covariance.

8. The wireless receiver of claim 6 wherein each recursion stage of the backward recursion portion generates a backward covariance based value and wherein the forward/backward recursive covariance based filter coefficient generating circuit includes a summation circuit operatively coupled to receive the backward covariance based value from each recursion stage of the backward recursion portion and to receive the basis vector data from the forward recursion portion and to output the filter coefficients.

9. The wireless receiver of claim 5 wherein the signal is a CDMA signal.

10. A method for equalizing a signal comprising:
    receiving data representing channel estimates;
    receiving data representing an auto-covariance matrix;
    performing forward recursion using at least the channel estimate data and the auto-covariance matrix data to produce a set of output values for each iteration stage of a forward recursion operation;
    storing the set of output values in memory;
    performing backward recursion by receiving the data representing the auto covariance matrix, and using the set of output values from forward recursion that are stored in the memory to generate filter coefficients for a filter.

11. The method of claim 10 wherein performing backward recursion includes:
    generating a backward covariance based value for each backward recursion stage based on the stored output values from a corresponding forward recursion operation;
    storing the backward covariance based value from each recursion stage of a backward recursion operation; and
    wherein generating the filter coefficients includes determining a set of filter coefficients based on the stored backward covariance based values and data from the channel estimates.

12. The method of claim 10 wherein the stored set of output values includes at least one of: basis vector data, p-scaler values and z-scaler values.

13. The method of claim 10 wherein forward recursion includes using data representing channel estimates for a group of chips used in a wireless communication and wherein the data representing the auto-covariance matrix.

* * * * *